(12) United States Patent
Senguttuvan et al.

(10) Patent No.: US 11,580,810 B2
(45) Date of Patent: Feb. 14, 2023

(54) MODULAR MOBILE POINT OF SALE DEVICE HAVING SEPARABLE UNITS FOR CONFIGURABLE DATA PROCESSING

(71) Applicant: PAYPAL, INC., San Jose, CA (US)

(72) Inventors: Guhan Senguttuvan, San Jose, CA (US); Satish Narayan Govindarajan, Los Altos, CA (US); Anantharaj Uruthiralingam, Santa Clara, CA (US); Carlos Manuel Rivas, Redwood City, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/158,448

(22) Filed: Jan. 26, 2021

(65) Prior Publication Data

US 2021/0248857 A1 Aug. 12, 2021

Related U.S. Application Data

(63) Continuation of application No. 15/855,387, filed on Dec. 27, 2017, now Pat. No. 10,902,694.

(51) Int. Cl.
*G07F 7/08* (2006.01)
*G07F 7/10* (2006.01)
(Continued)

(52) U.S. Cl.
CPC ......... *G07F 7/0886* (2013.01); *G06Q 20/204* (2013.01); *G06Q 20/3227* (2013.01);
(Continued)

(58) Field of Classification Search
CPC .... G07F 7/0886; G07F 7/1025; G07F 7/1033; G07F 7/0893; G06Q 20/204; G06Q 20/3227; G06Q 20/3278; G07G 1/0045
See application file for complete search history.

(56) References Cited

U.S. PATENT DOCUMENTS

| | | |
|---|---|---|
| 2002/0103663 A1 | 8/2002 | Bankier et al. |
| 2007/0036353 A1 | 2/2007 | Reznik et al. |

(Continued)

OTHER PUBLICATIONS

Extended European Search Report for European Application No. 18894481.3 dated Aug. 27, 2021, 7 pages.
(Continued)

*Primary Examiner* — Sonji N Johnson
(74) *Attorney, Agent, or Firm* — Haynes and Boone, LLP

(57) ABSTRACT

There are provided systems and methods for a modular mobile point of sale device having separable units for configurable data processing. A modular device may include a main unit that includes data processing features to allow for a mobile point of sale, including a data entry unit for payment data, a communication component to secure communicate that data to a centralized transaction processor, and a processing unit to receive the data and instruct the centralized to process the data with an online service provider. The module device may also be physically and communicatively coupled to additional modules that may increase the on-device functionality of the main unit, include a module to allow user input and additional modules to accept other types of transaction input. On detection of a connected unit, the main unit may secure connect to and authenticate each attached module.

20 Claims, 6 Drawing Sheets

(51) Int. Cl.
  *G06Q 20/32* (2012.01)
  *G06Q 20/20* (2012.01)
  *G07G 1/00* (2006.01)

(52) U.S. Cl.
  CPC ....... *G06Q 20/3278* (2013.01); *G07F 7/1025* (2013.01); *G07F 7/1033* (2013.01); *G07G 1/0045* (2013.01)

(56) References Cited

U.S. PATENT DOCUMENTS

| | | |
|---|---|---|
| 2009/0055323 A1 | 2/2009 | Rebidue et al. |
| 2010/0299265 A1 | 11/2010 | Walters |
| 2013/0098987 A1* | 4/2013 | Jimenez Lamo ..... G07F 7/0886 235/375 |
| 2013/0124348 A1* | 5/2013 | Lal ....................... G06Q 20/202 705/17 |
| 2013/0290591 A1 | 10/2013 | Schwarzkopf et al. |
| 2016/0098704 A1 | 4/2016 | Yonke et al. |
| 2016/0203455 A1 | 7/2016 | Hicks et al. |
| 2016/0260115 A1* | 9/2016 | Badger ................. G06Q 20/26 |
| 2017/0004475 A1* | 1/2017 | White ................ G06Q 20/3567 |
| 2017/0351889 A1 | 12/2017 | Govindarajan et al. |

OTHER PUBLICATIONS

International Appl. No. PCT/US2018/067703, PCT Search Report and Written Opinion of the International Searching Authority, dated Apr. 25, 2019, 12 pages.
International Appl. No. PCT/US2018/067703, Preliminary Report of Patentability dated Apr. 25, 2019, 10 pages.

* cited by examiner

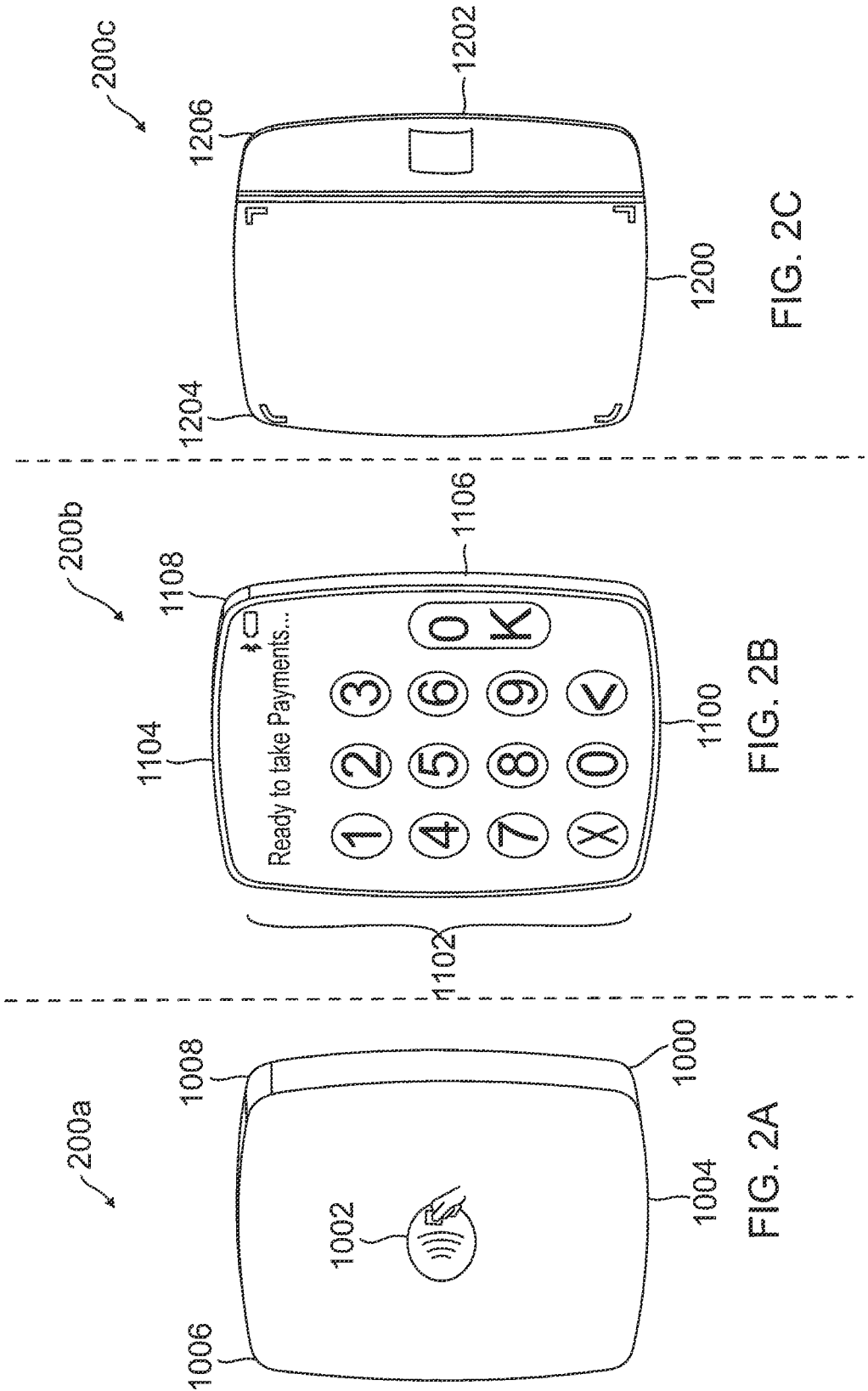

MODULAR MOBILE POINT OF SALE DEVICE HAVING SEPARABLE UNITS FOR CONFIGURABLE DATA PROCESSING

CROSS REFERENCE TO RELATED APPLICATIONS

This application is a continuation of U.S. application Ser. No. 15/855,387, filed Dec. 27, 2017, which is incorporated herein by reference in its entirety.

TECHNICAL FIELD

The present application generally relates to connectable hardware modules that configure data input and perform processing for a main module based on the attached modules, and more specifically to a modular and mobile point of sale device that detects and securely connects with attached modules to configure transaction data entry and perform data processing.

BACKGROUND

With the increasing use of payment cards, such as debit and credit cards having a magnetic stripe or embedded chip with stored data, merchants have increased use of mobile payment processing terminals acting as the point-of-sale device. For example, mobile magnetic stripe and/or EMV card readers are capable of providing mobile payment processing at a merchant location or with a mobile merchant through a small device capable of being carried by the merchant or merchant's employees. These payment terminal devices often include a reader type component, as well as hardware that may read payment data encoded on the cards memory (e.g., the magnetic stripe and/or EMV chip). However, these devices do not provide additional functionality, and are not customizable to each merchant's specific needs, as well as changing needs to particular merchants depending on location or time. This requires that the payment terminal devices connect to another computing device, such as a mobile phone or tablet computer.

BRIEF DESCRIPTION OF THE DRAWINGS

FIG. 2A is an exemplary main hardware module for a chip card reader having data processing and communication components, according to an embodiment;

FIG. 2B is an exemplary hardware module for personal identification number (PIN) data entry, according to an embodiment;

FIG. 2C is an exemplary hardware module for magnetic stripe reading, according to an embodiment;

Figure 1:
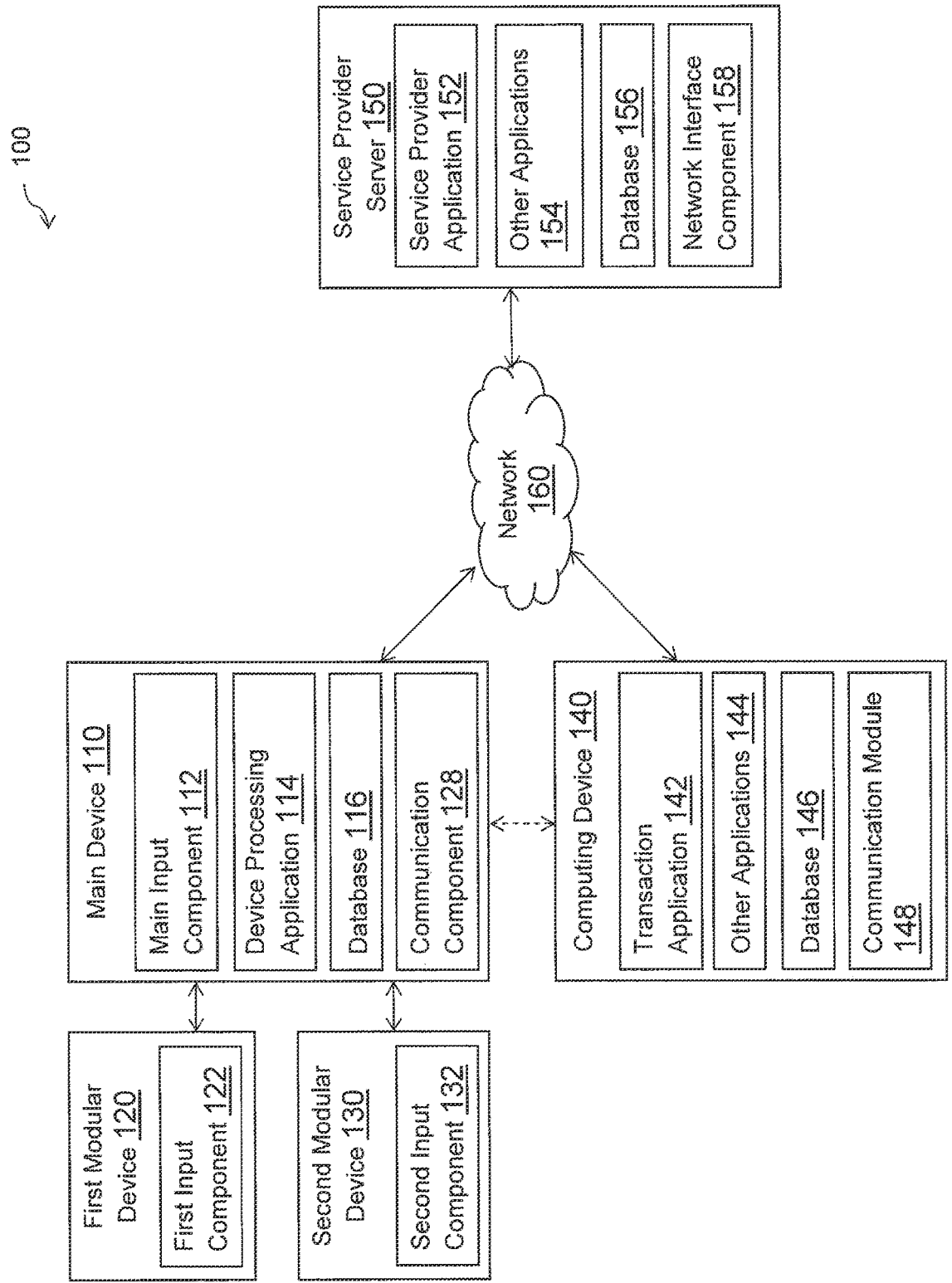
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a modular mobile point of sale device having separable units for configurable data processing. Systems suitable for practicing methods of the present disclosure are also provided.

In order to accept input of payment information from a customer, a merchant, including an employee of the merchant, may utilize a modular and mobile point of sale (POS) and transaction processing terminal device that provides the described features as discussed herein. A main or central module of the modular device may include various input devices to allow for entry of data, such as an EMV card reader. An EMV card may correspond to a specific type of physical payment card having an embedded chip that may be read by a standardized EMV reader, where the chip meets the EMV (Europay, MasterCard, and Visa) standard for the embedded microchip that stores and secures digital payment card data. The main module of the modular device may include other types of input components, a near field communication (NRF) or radio-frequency identifier (RFID) tag or chip reader, and a communication module or component to connect to a centralized computing device at a location of use of the modular device and provide received data to the centralized device (e.g., through Bluetooth, BLE, WiFi, LTE Direct, RFID, NFC, or other short range communication protocol) for processing using an online transaction processing service. The reader may accept payment card data and other types of payment instruments from other sources, such as a mobile phone or NFC tag of a consumer through an NFC tap and reading process or other communication process (including an RFID tag/reader that may also function through "tapping" or otherwise bringing an RFID tag in near proximity to an RFID reader). However, in certain embodiments, the main module may also be configured for network connectivity, including over 3G, 4G, 4G Long Term Evolution (LTE), 5G, other 3rd Generation Partnership Project (3GPP)-based cellular communications, or through a network router or connectivity device at a location, such as through WiFi communications with a network router. Thus, the main module may include a main communication component or an attachable communication component that may allow for direct network communications with the online transaction processor or other online service provider.

Additionally, the main module may include a non-transitory memory, which may store one or more applications executable by the modular device. One or more hardware processors of the modular device may be used to access the memory and execute one or more of the applications. A processing application may be used to receive electronic transaction data during a checkout process and process the transaction data. The processing application may also be used to process a transaction electronically with an online service provider, for example, by either utilising the centralized computing device to process data with the service provider or directly connecting with the service provider over a network for processing. Thus, the processing application may be used for data communication and processing with one or more other remote devices or servers. The processing applications may be used to maintain, update, and/or charge the modular device, as well as establish connections between the main module and additional modules, devices, or servers. The modular device may include additional hardware and/or software components as required to be a mobile point of sale device to accept payment data and process the payment data or configure and cause another device to perform electronic transaction processing using received payment data. Prior to receiving data and based on connected modules of the modular device, the processing application may configure and/or adjust the operations and available data input devices and processes available to the modular device and used for transaction processing, as discussed herein.

Modular device may therefore be used during a checkout process to receive input from a customer when the merchant or merchant's employee is performing checkout and transaction processing, such as input for the customer's payment card (e.g., insertion of the payment card's EMV chip, tapping of an NFC tag or chip, bringing an RFID tag nearby an RFID reader, or other input). The transaction processing terminal device may determine the customer and/or payment card's payment information, and may provide the transaction information to a connected centralized communication device for processing (e.g., using a backend payment processor with the centralized device). In order to perform electronic transaction processing as necessary for particular environments, locations, times, and/or data entry needs, the modular device may be configured with different modules, which may be connectable and separable as needed based on the specific data entry and processing requirements needed. For example, the main module may be required for EMV and RFID chip data entry and processing, as well as communication with other devices and/or a transaction processor for transaction data processing and approval. The main module may also be configured with additional modules to provide specific functionality and data entry, which may increase electronic transaction processing ease, speed, and security.

One type of connectable module may correspond to a personal identification number (PIN) touch pad allowing for entry of PIN data for a payment card, as well as other types of transaction data entry (e.g., a tip amount to be added, confirmation and acceptance of payment terms, entry of a transaction amount or transaction/item identifier, etc.). The PIN pad may more generally correspond to any type of user input device that may be used to enter authentication credentials for a user and/or payment instrument. In various embodiments, the module including the PIN pad may also allow for data output, for example, through an output screen associated with the PIN pad. The PIN pad may be output through the output screen, and may also display other data in place of the PIN pad or with the PIN pad. For example, the PIN pad may correspond to a touch screen interface that may display a PIN pad or other data entry pad (including an alphanumeric keypad or a keyboard), which may allow for data entry. The PIN pad may be required to meet specific standards for security when entering and communicating PIN data, such as a PCI Security Standards Council specification for a particular PIN entry keypad and input unit.

However, other types of output displays may also be used with a static or physical key PIN pad, such as an LED display, output screen, etc. The PIN pad module may include one or more data processing units, including a hardware processor and a non-transitory memory, that allows for use, display, receipt, and output of data, which may be performed by one or more applications or executable processes. The PIN pad module may also include a wired or wireless communication component to interface with the main module and/or other modules, for example, through USB, microUSB, Lightning®, pin connector, or other type of wired connection, or through Bluetooth, BLE, LTE Direct, WiFi, or other type of wireless connection. The main module may therefore receive data from the PIN pad through interfacing with the PIN pad module's communication component when the PIN pad module is connected to the main module physically and/or communicatively.

Another type of connectable module may include a module having one or more types of payment instrument data entry components, including more legacy types of payment card data entry (e.g., a magnetic stripe reader) as well as payment instrument data from another source (e.g., from a mobile device of a consumer through wired or wireless communications). A magnetic stripe reader or other type of reader may read data from a magnetic stripe of a payment card or other card (e.g., gift card, smart card with configurable magnetic data, etc.). The payment data entry module may further include hardware necessary to interface with the reader to determine data from input by the customer through the card. The module may also include a scanner or camera for input of bar/QR codes and/or a short range wireless communication component (e.g., through RFID, NFC, Bluetooth Low Energy (BLE), LTE Direct, WiFi, or other short range wireless communication protocol) to interface with a mobile device of the consumer. The payment data entry module may include one or more data processing units, including a hardware processor and a non-transitory memory, that allows for use, display, receipt, and output of data, which may be performed by one or more applications or executable processes. The payment data entry module may also include a wired or wireless communication component to interface with the main module and/or other modules, for example, through USB, microUSB, Lightning®, pin connector, or other type of wired connection, or through Bluetooth, BLE, LTE Direct, WiFi, or other type of wireless connection. The main module may therefore receive data from the payment data entry module through interfacing with the module's communication component when the payment data entry module is connected to the main module physically and/or communicatively.

In order to configure the modular device with the main module and the separable and connectable modules for specific types of data entry and processing, each module of the modular device may include a physical connection interface, as well as a communication interface, for communication between the modules, or at least between the main module and each attached module. The physical interface may correspond to a physical, mechanical, and/or magnetic attachment between adjacent modules. The physical interface may allow for each of the modules to be joined to an adjacent module in a secure but removable manner, which may allow for the module device to be held and used as a singular unit. In certain embodiments, the physical interface may include electrical components to allow for connection through one or more interfaces, as well as disconnection through the interface. Once physically connected, the modules may be communicatively linked through a wired or wireless connection for the exchange of data. For example, a physical interface may cause one or more processes to execute and cause the main module's communication component, as well as the communication component of any attached modules, to search for nearby modules and/or establish a link between the modules.

The physical interface may also signal the availability of a module for communicative coupling through a wired or wireless connection, and may include the wired connection. Where a wired connection is established on physical connection, the main module and any connected modules (or connected modules between each other to the main module) may detect the other modules through the active wired connection and exchange data, including authentication protocols and verification procedures, as well as input data. A wireless connection may also be established through Bluetooth, BLE, LTE Direct, WiFi, or other type of wireless connection, where the presence of a nearby module detected through a physical interface (e.g., button depression, movement of a latch, etc.), or electrical/magnetic signal and a wireless communication channel may be established. The wireless components of each module may also be range limited and include identifiers and shared secrets necessary to only connect with nearby attached modules. In certain embodiments, the communication link may be established prior to the physical attachment, and may not require the physical attachment. Thus, each communication component of the respective module may utilize wired or wireless connections for detection of nearby modules and establishment of a communication channel between the modules (e.g., through USB, microUSB, Lightning®, or other type of wired connection, or through Bluetooth, BLE, LTE Direct, WiFi, or other type of wireless connection).

On detection of a nearby or connected module used for data input and processing, the main module may perform one or more processes to configure data input and perform processing with another computing device and/or service provider, as well as enable the functionality of the connected module. The main module may communicatively link to the attached module and determine input devices and data processing units available to the connected module. For example, where a PIN pad module is connected, the main module may determine that PIN entry is available through the module. The PIN pad module may also allow for data output by the main module, and may include processes usable for such data output and display. Connection of a magnetic stripe reader, camera, or wireless device communicator module may also signify the available of such devices for use by the main module. Once the input devices are detected, the main unit may configure data entry or input processes, as well as operations for data processing and communication by the main unit with one or more other devices. Thus, the main module may detect connected modules and may specifically configure and adjust operations available for data entry and processing specifically based on the connected modules.

The main module may also configure a communication device connected to the main module where necessary for data communication and processing with an online service provider. For example, a communication device may be utilized by a user, such as a merchant, to perform various merchant and transaction processes, including sales, checkout, payment processing, and other merchant transactions. In this regard, the communication device, such as a mobile smart phone, tablet computer, wearable computing device, or other type of computing device, may communicatively connect to the modular POS device to provide sales to customers and process transactions. The communication device may also more generally correspond to a centralized computing device at a location to provide transaction processing services to a plurality of modular POS devices. The communication device may therefore include one or more software processes to perform the aforementioned actions, which may be utilized with an online service provider. For example, the communication device may include a sales application, which may provide sales, checkout, and payment processing services to the user through data received from the modular device. Such software processes may be utilized through the hardware features of the communication device, such as the hardware processor, device display and other output devices, network access components, input devices, etc. The communication device may therefore include various hardware and software components. Additionally, the communication device may include additional hardware features that allow execution of the processes, such as a power source (e.g., a battery, power cord for an outlet, etc.). The centralized or other communication device for the modular POS device may provide maintenance, updating, and/or charging, or an online service provider may do so when the modular device has network connectivity. The modular device may receive and execute software version and/or required software updates, firmware version and/or required firmware updates, or other updates viability for usage of the modular device.

Thus, the communication device may be used to perform some of the data input and/or processing requirements of the modular device, depending on the modules connected to the main module. For example, where only the main module is used for EMV card reading, the communication device may be required to enter transaction information (e.g., items, identifiers, amounts, merchant information, etc.), as well as receive certain payment information, such as a PIN for a payment card. The communication device may also interface with the online service provider to exchange data and perform transaction processing. However, on connection of the PIN pad module, the main module may reconfigure data input and processing by the main module and the computing device to allow for PIN entry through the PIN pad module and remove the functionality from the computing device (or allow both devices for PIN entry if desired). The PIN pad module may also be capable of entry of transaction information, which may remove or replace transaction data entry on the main computing device and configure the modular device for transaction data entry through the PIN pad. Similarly, connection of a magnetic stripe reader module may reconfigure data entry to allow for magnetic stripe data entry through the connected module. Additionally, if a module is connected, or the main module has network and transaction processing functionality, the main module may disconnect or not require the computing device to interface with the online service provider for electronic transaction processing using the input transaction and payment instrument data. Thus, if the main module detects a component capable of entry of transaction data with payment instrument data and network communications, the main module may interface directly with the online service provider for electronic transaction processing over a network.

On connection of a module to the main module, the main module may be required to authenticate the attached module and verify that the attached module is not fraudulent (e.g., a PIN key logger or card skimmer). The main module and an attached module may execute an authentication and/or verification process, for example, through sharing and/or verifying stored data. The main module may also require that an attached module have an authentication credential entered by a user, such as a password. Once authenticated and verified the main module and the attached module may share a secret for secure and/or encrypted communications. Once the authentication and verification process(es) is/are completed, the main module device may signal that the attached module is now good or viable for use or provide some output notification, which may be provided on an output component of the main module and/or attached module (e.g., display screen, LED, speaker or other audio output, etc.). For example, a light may turn to green (or other color), or the output display may show "Ready for use" on the attached module. The notification may also cycle through a color or message, or otherwise be dynamic to prevent fraud through single color or notification output. In certain embodiments, attached modules may also perform a similar authentication and/or verification process of a main module to prevent security breaches by a fraudulent main device that attempts to perform transaction processing using a trusted and secure PIN pad module or payment card entry module.

The main module may also detect a disconnection of an attached module. For example, a dedicated connection signal or communication channel may be generated between the main module and the attached module on attachment. If the signal is interrupted or the channel ends (e.g., the module is removed and communications cease between the modules), the main module may then output an alert that the module is disconnected to prevent fraud, damage, and/or incorrect data input and processing and notify a user that the module is no longer available for the data input and processing. The output alert may be performed through the output component of the main module and/or attached module, such as through a visual or audio indicator. Additionally, a disconnected module may also output a signal identifying the ending of the connection signal/channel. After disconnection, the main module may then reconfigure data input and processing operations to a default state or previous state prior to the attachment of the module. Where the state requires use of the computing device at the location, the main module may reconnect with the computing device and utilize the computing device for the no longer available data input and processing operation(s). The main module and/or the computing device may also emit a signal to deactivate the removed device.

The main module may further provide intelligent selection of other or sub modules, computing devices and/or data input and processing operations. For example, current health, maintenance, power, and/or other data of an attached module may be used to select whether the module is used. Additionally, selection of the module may depend on cache or memory size and potential transaction data for receipt, uploading, and processing. The specification of the computing device at the location may be retrieved, where the specifications may correspond to the device type (e.g., smart phone, tablet, etc.), hardware capabilities, software capabilities, installed software, available hardware devices, operating system, or other specification. Such information may be used to determine which devices are most compatible for data input and processing. For example, PIN input may function better or be more secure with a tablet. In such embodiments, the presentation on the output display of the communication device may affect the selection of which modules to use.

Thus, the modular device may be used to customize and configure data input and processing techniques and operations across a plurality of different devices by detecting the presence of a data input device connected to a main unit and automatically verifying and connecting to the device. The main unit then causes configuration of the main unit's operations, as well as a connected computing device, based on the detected input devices. This allows a user, such as a merchant or other electronic transaction processing entity, to specifically configure device tasks depending on their current needs in a fast, secure, and frictionless manner. Device configurations are provided in a more seamless manner by allowing for the modular device to add or remove particular modules that affect data input and/or processing.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a main device 110, a computing device 140, and a service provider server 150 in communication over a network 160. A user, such as a merchant (not shown), may utilize main device 110 to perform transaction processing with computing device 140, which may utilize service provider server 150 in various embodiments to electronically process transaction. Main device 110 may also interface and connect with a first modular device 120 and/or a second modular device 130 to extend the functionality of main device 110. Thus, main device 110, first module device 120, and second modular device 130 may correspond to a modular system having connectable and separable modules and components for configurable data input and processing.

Main device 110, first modular device 120, second modular device 130, computing device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Main device 110 may be implemented as a hardware module and POS terminal for receiving input of transaction (e.g., payment) information that may utilize appropriate hardware and software configured for wired and/or wireless communication with first modular device 120, second modular device 130, computing device 140, and/or service provider server 150. Main device 110 may also include a physical, mechanical, electrical, and/or magnetic connection mechanism for interfacing and connecting with first module device 120 and second modular device 130. For example, in one embodiment, main device 110 may be implemented as a EMV chip reader, RFID reader, or other types of computing devices capable of transmitting and/or receiving data, including payment information. Main device 110 may be utilized by a user, such as a merchant, during processing for a transaction. In this regard, main device 110 may correspond to an input device that receives input correspond to transaction information, such as input of an EMV chip or other type of input. Although only one device is shown, a plurality of devices may function similarly.

Main device 110 of FIG. 1 contains device processing application 114, a main input component 112, a database 116, and a communication module 118. Device processing application 114 may correspond to executable processes, procedures, and/or applications with associated hardware. In other embodiments, payment terminal device 110 may include additional or different modules having specialized hardware and/or software as required.

Main device 110 further includes a main input component 112, which may correspond to an input device, component, or mechanism of main device 110. In this regard, main input component 112 may correspond to an EMV chip reader, an RFID scanner, or other type of input device that may read stored data from a physical object (e.g., a payment card having an embedded microchip) provided to the merchant by a customer for processing a transaction between the merchant and the customer. In other embodiments, main input component 112 may instead correspond to other types of data input component where the main data input component is for a different type of input. Main input component 112 may be used by device processing application 114 to receive data corresponding to the physical object, such as payment card data stored to a payment card.

Device processing application 114 may correspond to one or more processes to execute modules and associated devices of payment terminal device 110 to connect to first modular device 120, second modular device 130, and/or computing device 140, as well as receive data input from a customer and process the data with service provider server 150, which may include providing the data to computing device 140 for payment processing. In this regard, device processing application 114 may correspond to specialized hardware and/or software utilized by main device 110 to connect and/or disconnect from first module device 120 and/or second modular device 130. In this regard, device processing application 114 may include a communication application that may utilize communication module 118 of main device 110 to send and receive data signals between first module device 120 and/or second modular device 130. Device processing application 114 may establish a connection with first module device 120 and/or second modular device 130 using the data signals. In various embodiments, device processing application 114 may similarly connect with computing device 140. For example, where device processing application 114 utilizes a wireless connection between other devices, device processing application 114 may broadcast an identifier, such as a universally unique identifier (UUID), which may be receivable by first module device 120, second modular device 130, and/or computing device 140. In other embodiments, device processing application 114 may instead receive an identifier from first module device 120, second modular device 130, and/or computing device 140. Device processing application 114 may also utilize a direct wired connection and may detect first module device 120 and/or second modular device 130 using the wired connection and electrical signals, which may include receipt and/or exchange of one or more identifiers. Using the identifier(s), device processing application 114 may communicate with first module device 120, second modular device 130, and/or computing device 140. Device processing application 114 may also authentication first module device 120, second modular device 130, and/or computing device 140 when connected, for example, through verification of identifiers, stored data, a digital certificate, or other secure or encrypted data. Additionally, device processing application 114 may exchange a shared secret for secure communications.

Device processing application 114 may connect to first module device 120, second modular device 130, and/or computing device 140 for transaction processing. Thus, device processing application 114 may update and/or configure data input and processing operations of main device with first module device 120, second modular device 130, and/or computing device 140 when main device 110 is connected to first module device 120, second modular device 130, and/or computing device 140. Device processing application 114 may provide output of available data input and processing features available with first module device 120, second modular device 130, and/or computing device 140, and may configure first module device 120, second modular device 130, and/or computing device 140 for the data input and processing operations. Device processing application 114 may further include input operations based on those of first module device 120, second modular device 130, and/or computing device 140 connected to main device 110. Device processing application 114 may receive input, such as payment card information from a customer and transaction information from a merchant, which may be input using first module device 120, second modular device 130, and/or computing device 140. Device processing application 114 may then connect and/or communicate with computing device 140 for the purposes of transaction processing. In various embodiments, main device 110 may not require computing device 140 for transaction processing, and may interface with service provider server 150 over network 160 where the available components and modules for main device 110 allow such communications. Thus, a merchant associated with main device 110 may provide sales, checkout, and transaction processing services to customers through main device 110, first module device 120, second modular device 130, and/or computing device 140. In this regard, a customer in a transaction with the merchant may provide input to main device 110, where the input may correspond to transaction information. For example, the input may correspond to a payment card (e.g., EMV chip, etc.), or may be other types of input, including authentication information for a payment account, or other type of input. Device processing application 114 may receive the input through an input mechanism of main device 110 (e.g., first module device 120, second modular device 130, and/or computing device 140). Device processing application 114 may also receive transaction information for the transaction directly or from one or more of first module device 120, second modular device 130, and/or computing device 140. Device processing application 114 may provide the transaction information (including the payment card data input) to computing device 140 for transaction processing. Thus, device processing application 114 may interface with one or more applications of computing device 140 to provide the transaction information.

Main device 110 may further include database 116 stored to a transitory and/or non-transitory memory of main device 110, which may store various applications and data and be utilized during execution of various modules of main device 110. Thus, database 116 may include, for example, identifiers (IDs) such as IDs associated with hardware of main device 110 or other appropriate IDs, which may be used for module and device identification, authentication, and/or verification of first module device 120, second modular device 130, and/or computing device 140. Encryption keys or shared secrets may be stored to database 116 for secure communications with first module device 120, second modular device 130, and/or computing device 140. Database 116 may include input of payment card data, as well as any entered transaction data. In various embodiments, processes and operations that are available, unavailable, and/or configurable for data entry and processing may be stored to database 116.

Main device 110 includes at least one communication module 118 adapted to communicate with first module device 120, second modular device 130, computing device 140, and/or service provider server 150. In various embodiments, communication module 118 may include a cellular network device, DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, WiFi, and near field communication devices.

First modular device 120 and second modular device 130 may correspond to modular devices that are attachable and separable from main device 110. First modular device 120 and second modular device 130 may correspond to separate devices, which may include one or more functionalities. For example, first input component 122 or second input component 132 may correspond to a (PIN) touch pad allowing for entry of PIN data for a payment card, as well as other types of transaction data entry. The PIN pad may include an output display that may output additional data, including entered data or data required to be presented to a customer. First input component 122 or second input component 132 may instead or further correspond to other types of user input devices, including a keyboard, touch screen interface, or other input device capable of receiving payment information (e.g., a username, password, PIN or other authentication mechanism). First input component 122 or second input component 132 may also correspond to a module having one or more types of payment instrument data entry components, including a magnetic stripe reader or other type of card reader may read data from a magnetically encoded data from a magnetic stripe of a card or other card. First input component 122 or second input component 132 may correspond to a scanner or camera for input of bar/QR codes. first modular device 120 and second module device 130 may also correspond to a short range transceiver capable of receiving payment data, such as an RFID, NFC, Bluetooth Low Energy (BLE), LTE Direct, WiFi, or other short range wireless communication interface that communicates with a mobile device of the consumer. First input component 122 or second input component 132 may also include an interface with such data input devices to transmit data to main device 110.

First modular device 120 and second modular device 130 may include one or more processors and memories for receiving input, processing the input, and conveying the input to main device 110. First modular device 120 and second modular device 130 also include functionality to communicate with main device 110, verify main device 110 and/or be verified by main device 110, or otherwise performing processing tasks with main device 110. First modular device 120 and second modular device 130 may also include a wired or wireless communication component to interface with main device 110, for example, through USB, microUSB, Lightning®, pin connector, or other type of wired connection, or through Bluetooth, BLE, LTE Direct, WiFi, or other type of wireless connection. For example, first modular device 120 and second modular device 130 may connect with main device 110 through a USB, microUSB, Lightning®, or other wired connection, where first modular device 120 and second modular device 130 may interface with one or more APIs executing by main device 110 in order to perform the aforementioned features. However, in other embodiments, first modular device 120 and second modular device 130 may connect with main device 110 through a wireless connection, such as Bluetooth, BLE, RFID, NFC, LTE Direct, WiFi, or other short range communication protocol. In order to connect over a wireless connection, first modular device 120 and second modular device 130 may broadcast an identifier receivable by main device 110 over a short range proximity to first modular device 120 and second modular device 130. Main device 110 may receive the identifier, and use the identifier to establish a communication channel and/or exchange data. In other embodiments, main device 110 may broadcast the identifier, where first modular device 120 and second modular device 130 may similarly receive the identifier and use the identifier to open and establish a communication channel with main device 110 and/or exchange data. Thus, first modular device 120 and second modular device 130 may connect with main device 110 when in proximity to main device 110, for example, when main device 110 is placed on, nearby, or in physical connection to first modular device 120 and second modular device 130.

First modular device 120 and second modular device 130 also include a physical, mechanical, and/or magnetic interface to connect with a similar interface provided by main device 110. The physical interface may allow for first modular device 120 and second modular device 130 to attach to main device 110 and form a single physical unit. The physical interface may be utilized for or initiate the communication interface, for example, by connecting a wired connection or signaling a nearby and available device for wireless communications. First modular device 120 and second modular device 130 may include processes to update output displays based on received signaling, such as an authentication alert and/or an alert of disconnection from main device 110. For example, first modular device 120 and second modular device 130 may change output displays, such as LEDs or other signal lights, which may indicate whether first modular device 120 and second modular device 130 are authenticated and/or available for use. For example, where first modular device 120 and/or second modular device 130 is/are unavailable (e.g., when not authenticated, connected, or charged), an output display may show a red light or display "Unavailable" or "Do not use." However, where first modular device 120 and/or second modular device 130 is/are available, the output display may show a green light or display "Available" or "Ready for use." The output display may also display a dynamic output, such as a pattern, cycle, or message, which may be used to deter fraud by unauthenticated or verified devices.

Computing device 140 may be implemented as a communication device that may utilize appropriate hardware and software configured for wired and/or wireless communication with main device 110 and/or service provider server 150. For example, in one embodiment, computing device 140 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Computing device 140 may correspond to and be utilized by a merchant for transaction processing based on received transaction data from main device 110. Although only one communication device is shown, a plurality of communication devices may function similarly.

Computing device 140 of FIG. 1 contains a transaction application 142, other applications 144, a database 146, and a communication module 148. Transaction application 142 and other applications 144 may correspond to executable processes, procedures, and/or applications with associated hardware. In other embodiments, computing device 140 may include additional or different modules having specialized hardware and/or software as required.

Transaction application 142 may correspond to one or more processes to execute modules and associated devices of computing device 140 to interface with main device 110 to receive payment instrument and/or transaction data, for example, by connecting with main device 110, as well as process the transaction data with service provider server 150. In this regard, transaction application 142 may correspond to specialized hardware and/or software utilized by computing device 140 to establish a connection with main device 110. The connection may correspond to a wired connection, where data is exchanged through a physical connection, such as a USB, microUSB, Lightning®, or other connection. In other embodiments, transaction application 142 may connect with payment terminal device 110 through a wireless connection, such as Bluetooth, BLE, RFID, NFC, LTE Direct, WiFi, or other short range wireless communication protocol. Additionally, after connecting with main device 110, terminal interface application 140 may receive data from main device 110, such as transaction information (e.g., payment card information, such as a credit/debit card number and backend processing gateway, authentication information, such as a username, password, or PIN, and/or transaction information, such as item data, item identifiers, transaction amount, merchant account identifiers or other merchant information, and other data necessary to process the transaction). Transaction application 142 may provide the transaction information to service provider server 150 for processing.

Transaction application 142 may therefore provide sales, checkout, and payment processes for a transaction to purchase one or more items for sale from the merchant corresponding to computing device 140. In this regard, transaction application 142 may provide a convenient interface to permit a merchant to enter, view, and/or edit items and/or services for purchase by a user. For example, transaction application 142 may be implemented as an application having a user interface enabling the merchant to enter item information and request payment for a transaction on checkout/payment of one or more items/services. Once a payment amount is determined for a transaction for items to be purchased by a customer, the merchant may request payment from the customer, for example, through transaction information input to main device 110, first modular device 120, second modular device 130, and/or transaction application 142. For example, transaction application 142 may be required where first modular device 120 and/or second modular device 130 do not provide a PIN pad for PIN entry for a payment card, or where the merchant is required to enter item sales and merchant data. The provided transaction information may be communicated to computing device 140 with the transaction and transaction information for approval by service provider server 150. A service provider server, such as service provider server 150, may process the transaction with the provided transaction information and determine whether to approve or decline the transaction using the provided payment instrument. Transaction application 142 may then receive the results of the transaction processing, and complete the transaction with the customer, for example, by providing authorization to release items to the customer for the transaction or declining the transaction where the customer is not authenticated or the transaction is not authorized (e.g., insufficient funds). Additionally, where the functionality to process transactions may be configured by main device 110 alone using attached modules, the above described processes of transaction application 142 may be included in one or more of main device 110, first modular device 120, and/or second modular device 130. Thus, main device 110 may process the transaction directly with service provider server 150 without the use of computing device 140.

Computing device 140 includes other applications 144 as may be desired in particular embodiments to provide features to computing device 140. For example, other applications 144 may include security applications for implementing client-side security features, programmatic client applications for interfacing with appropriate application programming interfaces (APIs) over network 160, or other types of applications. Other applications 144 may also include email, texting, voice and IM applications that allow a user to send and receive emails, calls, texts, and other notifications through network 160. In various embodiments, other applications 144 may include financial applications, such as banking, online payments, money transfer, or other applications associated with computing device 140. Other applications 144 may contain software programs, executable by a processor, including a graphical user interface (GUI) configured to provide an interface to the user.

Computing device 140 may further include database 146 which may include, for example, identifiers such as operating system registry entries, cookies associated with transaction application 142 and/or other applications 144, identifiers associated with hardware of computing device 140, or other appropriate identifiers, such as identifiers used for payment/user/device authentication or identification. Identifiers in database 146 may be used by a payment/credit provider to associate computing device 140 with a particular account maintained by the payment/credit provider. Database 146 may further include payment information, transaction information, and/or results.

Computing device 140 includes at least one communication module 148 adapted to communicate with main device 110 and/or service provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by an online service provider, which may provide services for electronic transaction processing with a merchant. In this regard, service provider server 150 includes one or more processing applications which may be configured to interact with main device 110, computing device 140, and/or another device/server to perform electronic transaction processing. In one example, service provider server 150 may be provided by PAYPAL®, Inc. of San Jose, Calif., USA. However, in other embodiments, service provider server 150 may be maintained by or include a financial service provider and/or other service provider, which may provide electronic transaction processing services through the use of at least one device, application, website, and/or account.

Service provider server 150 of FIG. 1 includes a service provider application 152, other applications 154, a database 156, and a network interface component 158. Service provider application 152, and other applications 154 may correspond to executable processes, procedures, and/or applications with associated hardware. In other embodiments, service provider server 150 may include additional or different modules having specialized hardware and/or software as required.

Service provider application 152 may correspond to one or more processes to execute modules and associated specialized hardware of service provider server 150 to provide services to a merchant, such as transaction processing services of service provider server 150 utilized by main device 110 and/or computing device 140. In this regard, service provider application 152 may correspond to specialized hardware and/or software to establish an account, for example, a payment account, which may be utilized to send and receive payments and monetary transfers and engage in other financial transactions, including receipt of a payment for a transaction using transaction data entered to main device 110, first modular device 120, and/or second modular device 130. A user, such as a merchant, associated with main device 110 and/or computing device 140 may establish an account with service provider application 152 by providing personal and/or financial information to service provider server 150 and selecting an account login, password, and other authentication information. Service provider application 152 may authenticate the merchant for use of the account and/or identity on receipt of merchant data, such as an account token, authentication credentials, or other data entered prior to or during transaction processing. Once authenticated, service provider application 152 may be utilized to use various services provided by service provider server 150, such as payment services or other available service.

Service provider application 152 may then process payments to the merchant through the received payment information in a transaction from main device 110 and/or computing device 140. Service provider application 152 provide transaction processing and payment services through the aforementioned accounts, including digital wallets storing payment instruments, as well as by providing payments to the aforementioned accounts from a received payment instrument, including a credit/debit card, banking account, payment account with service provider server 150, and/or other funding instrument. Service provider application 152 may be used to provide a payment for a transaction using data input to main device 110, including through first modular device 120 and/or second modular device 130. Service provider application 152 may process the payment to provide a payment to an account of the merchant through processing the received payment instrument. Service provider application 152 may debit an account or payment instrument of the user and provide the payment to an account of the merchant. Service provider application 152 may also be used to provide transaction histories for processed transactions.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 160, or other types of applications. Other applications 154 may contain software programs, executable by a processor, including a graphical user interface (GUI), configured to provide an interface to the user when accessing payment provider server 134. In various embodiments where not provided by service provider application 152, other applications 154 may include connection and/or communication applications.

Additionally, service provider server 150 includes database 156. Accounts in database 156 may include entity information, such as name, address, birthdate, payment/funding information, additional user financial information, and/or other desired user data. A user, including customers or merchants, may link to their respective accounts through an account, user, merchant, and/or device ID, as well as a generated token, which may be provided to computing device 140 or another device for use. Thus, when an ID is transmitted to service provider server 150, e.g., from main device 110 and/or computing device 140, an account belonging to the merchant may be found. Additional transaction data, including payment card data and transaction histories, may also be stored to database 156.

In various embodiments, service provider server 150 includes at least one network interface component 158 adapted to communicate with main device 110 and/or computing device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

FIG. 2A is an exemplary main hardware module for a chip card reader having data processing and communication components, according to an embodiment. Environment 200a of FIG. 2A includes a main module 1000 of a modular device, for example, an exemplary embodiment of main device 110 discussed in reference to system 100 of FIG. 1.

Main module 1000 may provide a central unit of a modular device described in reference to main device 110, first modular device 120, and second modular device 130. Main module 1000 may therefore accept entry of data during electronic transaction processing, such as entry of payment card data through a payment card microchip. Main module 1000 may further execute default or original data input and processing operations, which may be configurable into different operations based on connection of one or more additional modules. Main module 1000 is shown as a square unit having one or more components. In other embodiments, different structures, body shapes, components, physical connectors, and/or connection ports may be used for main module 1000.

Main module 1000 is shown with an NFC tap reader 1002, which may be configured to accept an NFC "tap" or close touch contact or motion that allows NFC tap reader 1002 to detect a nearby NFC card or device having an NFC chip and antenna, and read data from the chip transmitted through the antenna. Other types of communications may also be used, such as an RFID tag and reader. Main module 1000 further includes an EMV chip reader 1004, which may correspond to a slot that accepts entry of an EMV card having an EMV chip, and includes an input device and reader to read payment card data from the EMV chip once inserted. Main module 1000 also includes additional components for use with one or more attachable modules, including a physical attachment mechanism 1006 on an external surface on main module 1000 that accepts and physically connects to one or more other modules. Main module 1000 may also include an LED 1008 that may output data to a user, including notifications and alerts during transaction processing, or for module pairing, battery life, authentication and security, and/or available use.

FIG. 2B is an exemplary hardware module for personal identification number (PIN) data entry, according to an embodiment. Environment 200b of FIG. 2B includes a secondary module 1100 of a modular device, for example, an exemplary embodiment of first modular device 120 or second modular device 130 discussed in reference to system 100 of FIG. 1.

Secondary module 1100 may provide an auxiliary module or connectable component described in reference to first modular device 120 and second modular device 130. Secondary module 1100 may accept entry of data during electronic transaction processing, such as entry of PIN data or other authentication data, as well as output data used during transaction processing. Secondary module 1100 may change and update the processing operations of main module 1000 when connected. Secondary module 1100 is shown as a square unit having one or more components. In other embodiments, different structures, body shapes, components, physical connectors, and/or connection ports may be used for secondary module 1100.

Secondary module 1100 may include a PIN pad interface 1102, which may correspond to a touch screen interface, physical PIN pad and keys, or other type of user input component that may accept input of data from a user, in particular, PIN data or other payment card authentication and authorization data. PIN pad interface 1102 may further include an output display 1104, which may output data to one or more users or merchants for viewing during transaction processing. PIN pad interface 1102 may also include a transaction authorization button 1106 to accept a transaction and allow for transaction processing. Similar to main module 1000, secondary module 1100 may also include an LED 1108 that may output data to a user, including notifications and alerts during transaction processing, or for module pairing, battery life, authentication and security, and/or available use. Although not shown in environment 200b, secondary module 1100 may also include a physical connector to an opposite or back side that may be used to physically connect with main module 1000, such as through physical attachment mechanism 1006, for the connection of secondary module 1100 to main module 1000 on a top surface of main module 1000.

FIG. 2C is an exemplary hardware module for magnetic stripe reading, according to an embodiment. Environment 200c of FIG. 2C includes a tertiary module 1200 of a modular device, for example, an exemplary embodiment of first modular device 120 or second modular device 130 discussed in reference to system 100 of FIG. 1.

Tertiary module 1200 may provide an auxiliary module or connectable component described in reference to first modular device 120 and second modular device 130. Tertiary module 1200 may accept entry of data during electronic transaction processing, such as entry of magnetic card data from a magnetic stripe. Tertiary module 1200 may change and update the processing operations of main module 1000 when connected. While tertiary module 1200 is shown as a square unit having one or more components, different structures, body shapes, components, physical connectors, and/or connection ports may be used for tertiary module 1200.

Tertiary module 1200 is shown with a data input component, magnetic stripe reader 1202, to accept swiping or entry of a payment card's magnetic stripe so that data encoded to the magnetic stripe can be read by main module 1000 and tertiary module 1200. Tertiary module 1200 includes a physical attachment mechanism 1204 that may be used to physically connect with main module 1000 on a bottom or opposite side of main module 1000 from that shown in environment 200a of FIG. 2A. Similar to main module 1000, tertiary module 1200 may also include an LED 1206 that may output data to a user, including notifications and alerts during transaction processing, or for module pairing, battery life, authentication and security, and/or available use.

Figure 2E:
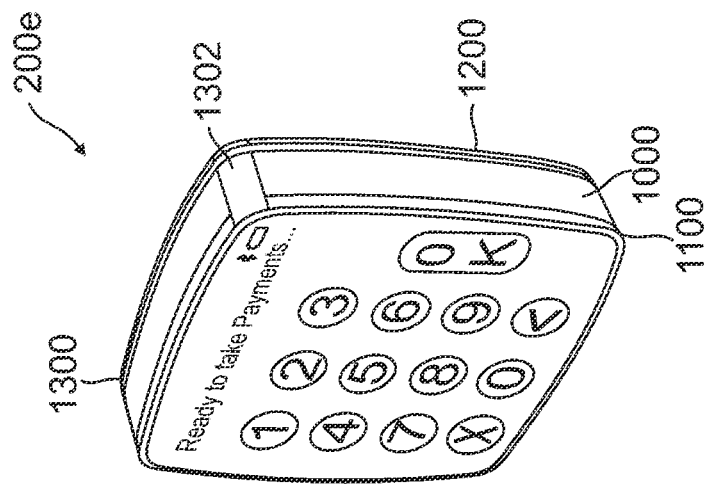
FIG. 2E is an exemplary modular point of sale unit having attachable modules for configurable data entry and processing, according to an embodiment.
Figure 2D:
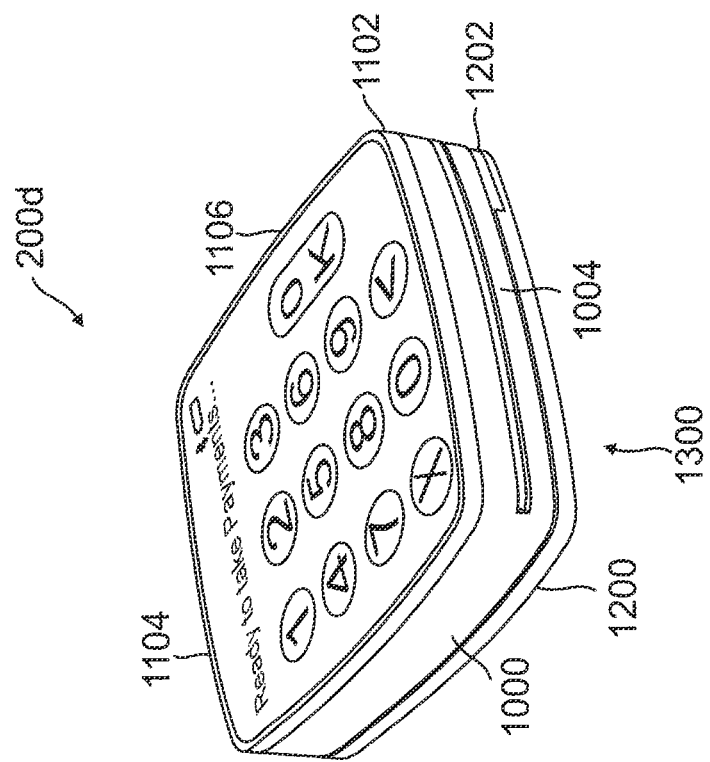
FIG. 2D is an exemplary modular point of sale unit having attachable modules for configurable data entry and processing, according to an embodiment.

FIG. 2D is an exemplary modular point of sale unit having attachable modules for configurable data entry and processing, according to an embodiment. Environment 200d of FIG. 2D includes a modular device 1300 having fully connected modules, for example, an exemplary embodiment of main device 110 connected with first modular device 120 and second modular device 130 discussed in reference to system 100 of FIG. 1.

An exemplary structure of modular device 1300 is shown in environment 200d of FIG. 2D. In other embodiments, different structures, body shapes, and/or ports may be used for modular device 1300. Modular device 1300 is shown with attached modules to form a single modular device, where each module is also separable. Based on the attached modules, modular device 1300 may configure data input and processing operations during payment card data entry and transaction processing as a mobile point of sale device. In this regard, main module 1000 is shown as connected to secondary module 1100 on top of main module 1000 and tertiary module 1200 below main module 1000. Each of secondary module 1100 and tertiary module 1200 is shown as physically connected to main module 1000, for example, through a physical, mechanical, electrical, and/or magnetic connection of main module 1000 on a front surface with secondary module 1100 and a back surface with tertiary module 1200. The physical connection may be used to establish a wired or wireless connection between main module 1000 and secondary module 1100, as well as between main module 1000 and tertiary module 1200.

Main module 1000 further includes one or more connection ports or interfaces, which may be utilized as a communication module to interface with one or more of secondary module 1100 and tertiary module 1200. For example, main module 1000 may include a wired connection port which may be used to connect through a wired connection with one or more physically attached modules or a wireless interface, which may generate wireless connections with one or more physically attached modules. Using a connection with secondary module 1100 and tertiary module 1200, main module 1000 may select one or more data input and processing functions or operations to perform as a mobile point of sale device based on the availabilities and the capabilities of secondary module 1100 and tertiary module 1200.

In this regard, main device 1000 may include a power supply, where power may be provided to hardware of main device 1000, as well as secondary device 1100 and tertiary device 1200, which may be used during the execution of software and associated processes of main device 1000. The power supply may also provide necessary power to charge secondary device 1100 and/or tertiary device 1200, as well as output signals using an output LED for each device. Main device 1000 may include one or more charging mechanism for main device 1000, as well as for secondary device 1100 and tertiary device 1200. The charging mechanism may correspond to wired charging through a wired connection, such as a USB, microUSB, Lightning®, or other connection. In other embodiments, the charging mechanism may be wireless, such as wireless inductive charging using an inductive coil.

Modular device 1300 is shown with various data input and processing functions, components, and capabilities based on main device 1000, secondary device 1100, and tertiary device 1200. For example, modular device 1300 includes EMV chip reader 1004 for input of EMV card data. Modular device 1300 also includes PIN pad interface 1102, output display 1104, and authorization button 1106 to accept PIN data or other payment card authentication and authorization data, as well as view transaction data and authorize transactions. Modular device 1300 also includes magnetic stripe reader 1202 to read data encoded to a magnetic stripe. Based on these components and capabilities, main module 1000 may configure itself, as well as secondary module 1100, tertiary module 1200, and any connected computing device, as a POS device to perform data input and processing during electronic transactions.

FIG. 2E is an exemplary modular point of sale unit having attachable modules for configurable data entry and processing, according to an embodiment. Environment 200d of FIG. 2D includes a connected modular device 1300, for example, an exemplary embodiment of main device 110 connected with first modular device 120 and second modular device 130 discussed in reference to system 100 of FIG. 1. Modular device 1300 in environment 200e of FIG. 2E provides a secondary view of modular device 1300 in environment 200d of FIG. 2D. In this regard, main module 1000 can be seen in a side view having secondary module 1100 attached to a front surface and tertiary module 1200 attached to a back surface through a physical connection. The physical connection may also enable a wired or wireless connection so that main module 1000 is communicatively coupled to secondary module 1100 and tertiary module 1200. FIG. 2E shows a side view fully encompassing LEDs of main module 1000, secondary module 1100, and tertiary module 1200 as modular device LED 1302, where modular device LED 1302 may provide a synchronized visual output during use to display validity of each module for use and prevent fraud.

Figure 3:
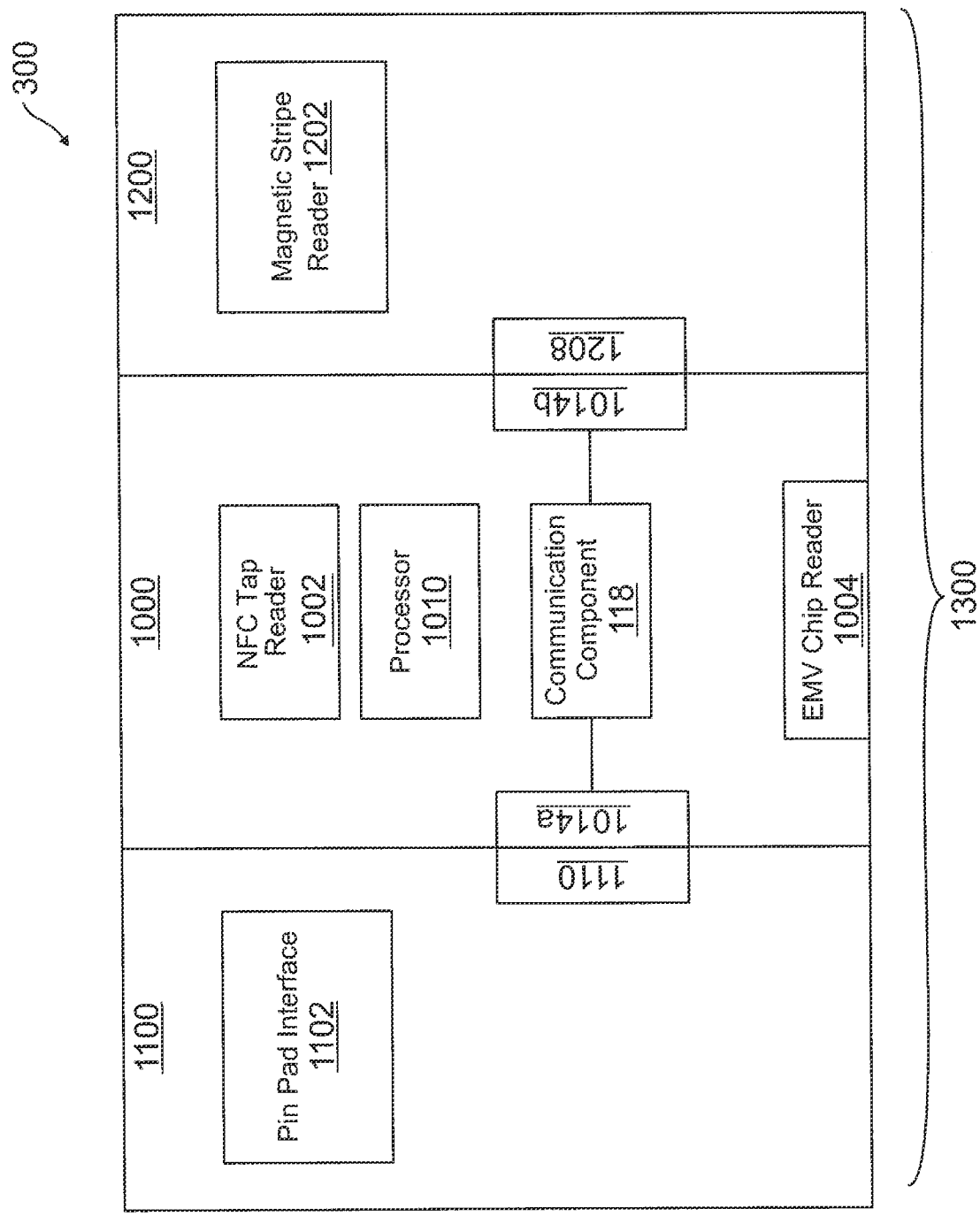
FIG. 3 is a block diagram for an exemplary system environment for a modular point of sale unit having attachable modules for configurable data entry and processing, according to an embodiment.

FIG. 3 is a block diagram for an exemplary system environment for a modular point of sale unit having attachable modules for configurable data entry and processing, according to an embodiment. Environment 300 of FIG. 3 includes a main module 1000, a secondary module 1100, and a tertiary module 1200 corresponding generally to the described devices and associated features found in environments 200a-e of FIGS. 2A-E, respectively.

Modular device 1300 is shown with main module 1000, secondary module 1100, and tertiary module 1200. Main module 1000 is shown with various capabilities for data input and/or processing, including NFC tap reader 1002 and EMV chip reader 1004. Further, secondary module 1100 includes PIN pad interface 1102 and tertiary module 1200 includes a magnetic stripe reader 1202 that may expand the data input and processing capabilities of main module 1000. In this regard, on detection, by main module 1000, of secondary module 1100 and/or tertiary module 1200 as connecting to main module 1000 through a wired or wireless connection (e.g., based on signaling received by main module 1000 from secondary module 1100 and/or tertiary module 1200), main module 1000 may configure its data input and processing capabilities based on the newly added functionality of secondary module 1100 and/or tertiary module 1200. Main module 1000 includes communication component 118 corresponding generally to the specialized hardware and/or software modules and processes described in reference to FIG. 1. In this regard, a processor 1010 may utilize communication component 118 to determine whether secondary module 1100 and/or tertiary module 1200 is available to be connected with main module 1000. For example, communication component 118 may be connected with a connector 1014a at or nearby an external surface on a left side of main module 1000. Connector 1014a may connect with another connector 1110 for secondary module 1100 when connector 1014a and connector 1110 are either touch or in close proximity so that signaling may be affected between connector 1014a and connector 1110. Similarly, a connector 1014b may be placed near or at an external surface on a right side of main module 1000, where connector 1014b may communicate with a connector 1208 for tertiary module 1200 when connector 1014b and connector 1208 are brought into contact or close proximity to effectuate signaling between the connectors. In this regard, the contact between connector 1014a and connector 1110 and/or between connector 1014b and connector 1208 may correspond to a wired connection, where the contact electrically bridges or completes a conducting pathway and allows for completion of a circuit for electrical signaling exchange.

Where a wireless connection is available between main module 1000 and secondary module 1100 or tertiary module 1200, the physical connection may signify the availability of secondary module 1100 or tertiary module 1200 for connection with main module 1000 wirelessly. In certain embodiments, an identifier or other data for establishing a connection may be broadcast over a short range by main module 1000, secondary module 1100, and/or tertiary module 1200, which may be a few inches, centimeters, or even millimeters so that the devices or modules may only detect the identifier if they are physically adjacent within communication range and/or connected. In other embodiments, an NFC or RFID data exchange through NFC or RFID antennas and readers may be used to exchange identifiers, shared secrets, or other data that may be used for authentication, verification, and/or communication exchange by main module 1000 with secondary module 1100 or tertiary module 1200, where physically connecting the modules initiates the data exchange. Once the devices are in physical proximity to allow for signaling exchange, main module 1000 may connect with secondary module 1100 or tertiary module 1200 and perform an authentication or verification of the module. Main module 1000 may then allow for data exchange if the module is verified, which may include data input and processing operations when modular device 1300 acts as a mobile POS device.

Figure 4:
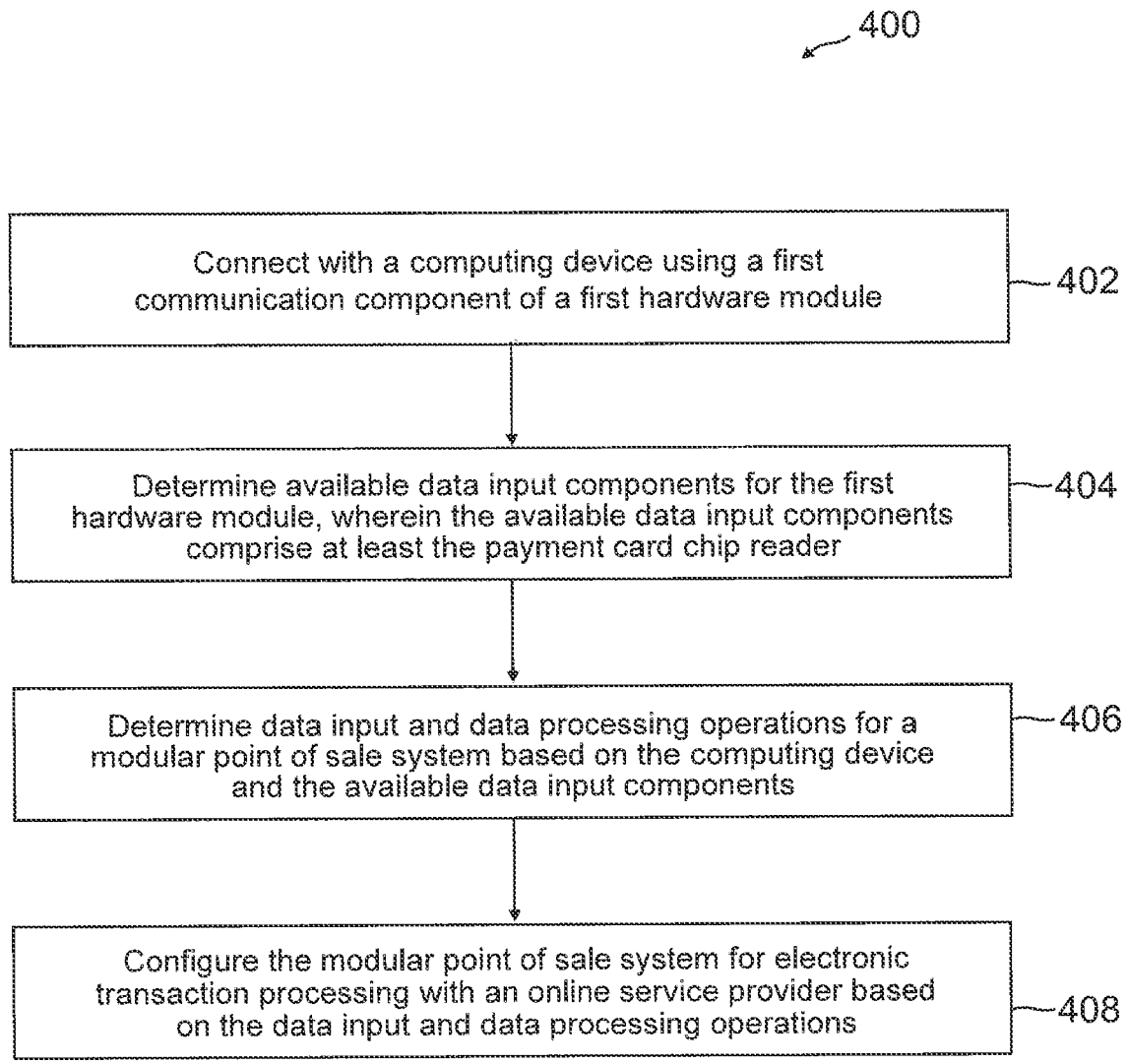
FIG. 4 is an exemplary process flowchart for use of a modular mobile point of sale device having separable units for configurable data processing, according to an embodiment.

FIG. 4 is an exemplary process flowchart for use of a modular mobile point of sale device having separable units for configurable data processing, according to an embodiment. Note that one or more steps, processes, and methods described herein may be omitted, performed in a different sequence, or combined as desired or appropriate.

At step 402 of a flowchart 400 in FIG. 4, a first hardware module connects with a computing device using a first communication component of the first hardware module. Available data input components for the first hardware module are determined, at step 404, wherein the available data input components comprise at least the payment card chip reader. A second hardware module comprising a second communication component configured to connect with at least the first hardware module may also be connected to the first hardware module, where the second communication component comprises a personal identification number (PIN) pad for entry of numerical data. The first hardware module may be physically attachable and separable from the second hardware module, wherein the first communication component connects with the second communication component when the first hardware module is physically connected to the second hardware module for data exchange, and wherein the available data input components further comprise the PIN pad. The PIN pad may utilize a PIN pad data entry and security standard for data transmission to the first hardware module When connected to the system, the first hardware module may request, through the PIN pad of the second hardware module, an authentication credential for authentication of the second hardware module on connection with the first hardware module, and in response to authenticating the second hardware module using the authentication credential, may further disconnect from a PIN pad entry process executed by the computing device. This may then configure the second hardware module for PIN entry, which may reconfigure a previous setting or operation of the first hardware module and any connected modules or the computing device.

A third hardware module comprising a third communication component may connect with at least the first hardware module, wherein the third hardware module comprises a magnetic stripe reader. The first hardware module may be physically attachable and separable from the third hardware module, wherein the first communication component connects with the third communication component when the first hardware module is physically connected to the third hardware module for data exchange, and wherein the available data input components further comprise the magnetic stripe reader. The first hardware module may the authenticate the third hardware module using a security handshake between the first hardware module and the third hardware module on connection of the first hardware module to the third hardware module. This may then configure the third hardware module for magnetic stripe entry, which may reconfigure a previous setting or operation of the first hardware module and any connected modules or the computing device.

Authenticating each module with the other connected module may be done through a security handshake. The first hardware module may also display at least one visual output associated with authenticating the second hardware module and the third hardware module. After connection a connection signal may be established by the first hardware module to the second hardware module and the third hardware module. In response to detecting an interruption of the connection signal with one of the second hardware module and the third hardware module, an alert of the interruption may be output. Moreover, in response to the interruption, at least one of the data input and data processing operations may be defaulted to the computing device. At step 406, data input and processing operations for a modular point of sale system are determined based on the computing device and the available data input components, where the modular point of sale system includes the first hardware module. The modular point of sale system is configured for electronic transaction processing with an online service provider based on the data input and processing operations, at step 408.

In various embodiments, after configuring the modular point of sale system, payment card input for a payment card may be received from a payment card chip reader in the first hardware module and transaction data input required for electronic transaction processing is determined using the data input and data processing operations, wherein the transaction data input is enter using at least one of the available data input components or the computing device. The payment card chip reader comprises at least one of an NFC tap reader or an EMV card chip reader. The transaction data input may then be requested through the at least one of the available data input components or the computing device, and the transaction may be processed using payment card input and the transaction data input. The first hardware module may connect with the computing device and configure the computing device to receive the transaction data input and a payment card authorization through the computing device.

Figure 5:
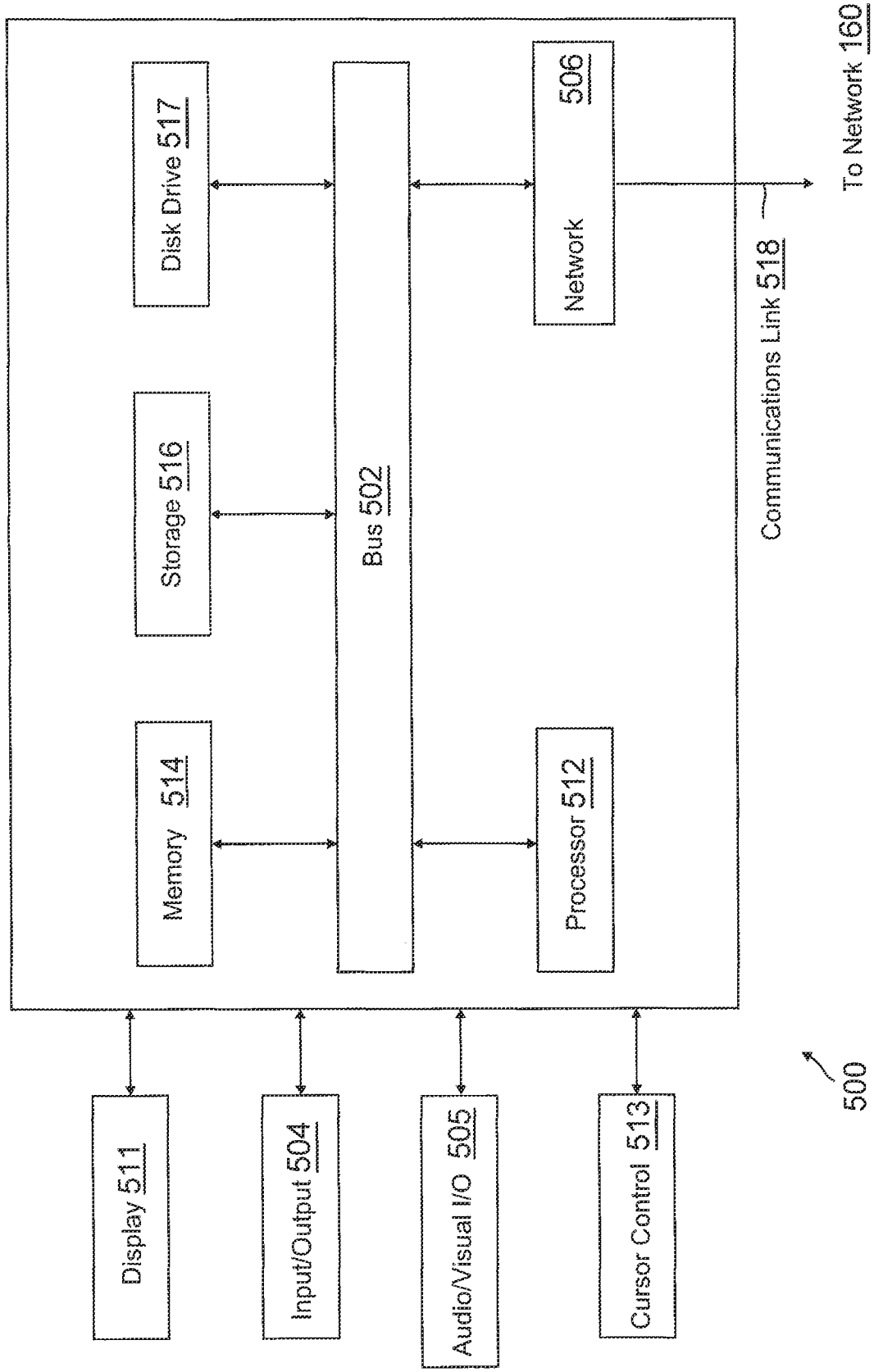
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
    accessing, by a first device, a first data input component available to the first device, wherein the first data input component is external to the first device;
    authenticating, by the first device, the first data input component and a second data input component through a security handshake performed with each of the first data input component and the second data input component;
    causing to be displayed, by the first device on the second data input component, an authentication indication using a respective visible output element on each of the first data input component and the second data input component;
    enabling a transaction processing operation of the first device to receive transaction data based on the authentication indication;
    receiving, by the first device, the transaction data from the first data input component using the transaction processing operation; and
    processing, by the first device, the transaction data with an online service provider based on the transaction processing operation.

2. The method of claim 1, wherein prior to said accessing the first data input component, the method further comprises the first device determining that the first device is communicatively coupled to the first data input component.

3. The method of claim 2, further comprising authenticating the first data input component using a security handshake between the first device and the first data input component on a connection of the first data input component to the first device.

4. The method of claim 1, wherein said enabling the transaction processing operation comprises configuring at least one application of the first device to receive transaction data using the first data input component.

5. The method of claim 1, further comprising:
    determining a transaction data input required for the transaction processing operation using the first data input component and the processing with the online service provider, wherein the transaction data input is entered using at least one of the first data input component or the first device; and
    requesting the transaction data input through the first data input component or the first device.

6. The method of claim 1, further comprising:
    determining an application from a plurality of applications on the first device based on the first data input component; and
    determining a data input operation for the application with the online service provider based on the transaction data.

7. The method of claim 1, wherein the processing the transaction data comprises:
    connecting, by the first device, with a centralized computing device at a location associated with the first device using short range wireless communications; and
    communicating, by the first device, the transaction data to the centralized computing device over the short range wireless communications with a transaction processing request for the transaction data with the online service provider, wherein the centralized computing device processes the transaction processing request over a network connection with the online service provider.

8. The method of claim 1, wherein the first device comprises a mobile computing device and each of the first data input component and the second data input component comprises wirelessly connectable components to the mobile computing device.

9. The method of claim 1, wherein prior to the enabling the transaction processing operation, method further comprises:
encrypting a communication channel between the first data input component and the first device.

10. A user device, comprising:
a non-transitory memory storing instructions; and
a processor configured to execute the instructions to cause the user device to:
establish a communication with a first input module, wherein the first input module is external to the user device;
configure, based on the communication with the first input module, a processing operation to use data received via the first input module as transaction data;
request transaction data input through at least one of the first input module or the user device;
access the transaction data provided by the first input module for the processing operation, wherein accessing the transaction data comprises determining the transaction data input required for the processing operation using the first input module and an online service provider, and wherein the transaction data input is provided by at least one of the first input module or the user device; and
communicate with the online service provider to process the transaction data based on the processing operation.

11. The user device of claim 10, wherein executing the instructions further causes the device to,
determine that the first input module is communicatively disconnected from the user device;
reconfigure, based on a determination that the first input module is communicatively disconnected, the processing operation of the user device from using data received via the first input module as the transaction data.

12. The user device of claim 10, wherein prior to establishing the communication with the first input module, the user device determines that the user device is communicatively coupled with the first input module.

13. The user device of claim 10, wherein establishing the communication with the first input module comprises authenticating the first input module using a security handshake between the user device and the first input module on a connection of the first input module with the user device.

14. The user device of claim 10, wherein said configuring the processing operation comprises configuring at least one application of the user device to receive transaction data using the first input module.

15. The user device of claim 10, wherein executing the instructions further causes the user device to,
determine an application from a plurality of applications of the user device based on the first input module; and
determine a data input operation for the application with the online service provider based on the transaction data.

16. A non-transitory machine-readable medium having instructions stored thereon, the instructions executable to cause performance of operations comprising:
establishing a communication between a computing device and a first input module, wherein the first input module is external to the computing device;
performing a security handshake with the first input module;
authenticating the first input module based on the security handshake;
displaying, by the computing device via the first input module, an authentication indication using a visible output on the first input module that indicates that at least one of the first input module or the computing device is enabled to authorize transactions and accept at least one of personal identification number (PIN) data or payment card authorization data;
reconfiguring, based on the authentication indication, a transaction processing operation to use transaction data received via at least one of the first input module or another input of the computing device;
receiving the transaction data from at least one of the first input module or the other input of the computing device for the transaction processing operation; and
processing the transaction data with an online service provider based on the transaction processing operation.

17. The non-transitory machine-readable medium of claim 16, wherein said performing the security handshake with the first input module is through a connection between the first input module and the computing device.

18. The non-transitory machine-readable medium of claim 16, wherein said reconfiguring the transaction processing operation comprises configuring at least one application of the computing device to receive transaction data using the first input module.

19. The non-transitory machine-readable medium of claim 16, wherein the operations further comprise:
determining transaction data input required for the transaction processing operation using the first input module and the processing with the online service provider, wherein the transaction data input is provided by at least one of the first input module or the computing device; and
requesting the transaction data input through the first input module or the computing device.

20. The non-transitory machine-readable medium of claim 16, wherein the operations further comprise:
determining an application from a plurality of applications on the computing device based on the first input module; and
determining a data input operation for the application with the online service provider based on the transaction data.

* * * * *